United States Patent
Malkan et al.

(10) Patent No.: US 12,206,684 B2
(45) Date of Patent: Jan. 21, 2025

(54) SECURITY AND SAFETY OF AN INDUSTRIAL OPERATION USING OPPORTUNISTIC SENSING

(71) Applicant: Rockwell Automation Technologies, Inc., Mayfield Heights, OH (US)

(72) Inventors: Chirag Malkan, Brookfield, WI (US); Kyle Crum, Bayside, WI (US); David Vasko, Hartland, WI (US); Steven T. Haensgen, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 410 days.

(21) Appl. No.: 17/471,783

(22) Filed: Sep. 10, 2021

(65) Prior Publication Data
US 2023/0078632 A1    Mar. 16, 2023

(51) Int. Cl.
*H04L 9/40* (2022.01)
*G05B 19/418* (2006.01)
(Continued)

(52) U.S. Cl.
CPC .... *H04L 63/1416* (2013.01); *G05B 19/41835* (2013.01); *G06F 8/65* (2013.01); *G06F 16/182* (2019.01); *G05B 2219/31449* (2013.01)

(58) Field of Classification Search
CPC . H04L 63/1433; H04L 63/20; H04L 63/1441; H04L 63/102; H04L 63/08;
(Continued)

(56) References Cited

U.S. PATENT DOCUMENTS

| | | | |
|---|---|---|---|
| 7,664,879 B2* | 2/2010 | Chan | H04L 67/14 |
| | | | 711/113 |
| 7,725,934 B2* | 5/2010 | Kumar | H04L 63/0245 |
| | | | 713/188 |

(Continued)

FOREIGN PATENT DOCUMENTS

| | | |
|---|---|---|
| EP | 3607484 B1 | 6/2021 |
| WO | 2020046260 A1 | 3/2020 |
| WO | 2020205974 A1 | 10/2020 |

OTHER PUBLICATIONS

EPO, European Application No. 22193678.4, Extended European Search Report, dated Jan. 23, 2023, pp. 1-7.

*Primary Examiner* — Sharif E Ullah
(74) *Attorney, Agent, or Firm* — Foley & Lardner LLP (57) ABSTRACT

A method for security and safety of an industrial operation includes receiving sensor information from a plurality of sensors of an industrial operation. Sensor information from at least a portion of the plurality sensors is used for functionality of a plurality of components of the industrial operation. The method includes monitoring data traffic of the industrial operation, and deriving a baseline signature from the sensor information. The baseline signature encompasses a range of normal operating conditions. The method includes identifying an abnormal operating condition of the industrial operation based on a comparison between additional sensor information from the plurality of sensors and the baseline signature and identifying an abnormal data traffic condition. The method includes determining that the abnormal operating condition correlates to the abnormal data traffic condition, and sending a security alert in response to determining that the abnormal operating condition correlates to the abnormal data traffic condition.

20 Claims, 5 Drawing Sheets

(51) Int. Cl.
*G06F 8/65* (2018.01)
*G06F 16/182* (2019.01)

(58) Field of Classification Search
CPC . H04L 63/10; H04L 2209/38; H04L 63/1416; H04L 2209/46; H04L 2209/805; H04L 41/046; H04L 41/0893; H04L 41/12; H04L 41/145; H04L 41/16; H04L 63/0853; H04L 63/104; H04L 63/1425; H04L 63/205; H04L 63/0272; H04L 67/563; G06F 2221/2101; G06F 21/552; G06F 21/554; G06F 21/56; G06F 21/566; G06F 2221/034; G06F 21/57; G06F 21/577; G06F 21/602; G06F 21/6209; G06F 21/6218; G06F 8/61; H04W 12/06; H04W 12/08; H04W 12/0027; H04W 12/00505; H04W 12/0609
USPC .......... 726/2, 21, 23, 36; 713/150, 163, 181; 380/255, 264, 276
See application file for complete search history.

(56) References Cited

U.S. PATENT DOCUMENTS

| | | | | |
|---|---|---|---|---|
| 7,962,582 B2* | 6/2011 | Potti | ..................... | H04L 63/102 370/400 |
| 8,010,085 B2* | 8/2011 | Apte | ..................... | G06F 21/577 709/227 |
| 8,464,335 B1* | 6/2013 | Sinha | ..................... | G06F 21/51 713/153 |
| 8,639,837 B2* | 1/2014 | Li | ..................... | H04L 69/22 709/236 |
| 8,656,154 B1* | 2/2014 | Kailash | ............... | H04L 63/0807 713/168 |
| 8,661,505 B2* | 2/2014 | Kougiouris | ............. | H04L 63/20 726/4 |
| 8,819,809 B2* | 8/2014 | Mullick | ................. | H04L 63/10 726/14 |
| 8,869,259 B1* | 10/2014 | Udupa | .................... | H04L 63/20 726/10 |
| 8,869,262 B2* | 10/2014 | Mullick | .............. | H04L 63/0876 709/227 |
| 8,955,091 B2* | 2/2015 | Kailash | ............... | H04L 63/1425 726/11 |
| 9,065,800 B2* | 6/2015 | Devarajan | ............... | G06F 21/56 |
| 9,100,424 B1* | 8/2015 | Thomas | ................. | H04L 69/16 |
| 9,258,329 B2* | 2/2016 | Narayanaswamy | ........................ | H04L 63/0245 |
| 9,344,393 B2* | 5/2016 | Boynton | ............. | H04L 63/0428 |
| 9,531,758 B2* | 12/2016 | Devarajan | ............... | H04L 63/20 |
| 9,634,943 B2* | 4/2017 | Jungck | ................ | H04L 41/5054 |
| 9,654,507 B2* | 5/2017 | Gangadharappa | ...... | H04L 63/20 |
| 9,660,998 B1* | 5/2017 | Sethi | ........................ | H04L 63/08 |
| 9,825,909 B2* | 11/2017 | Ardeli | ................. | H04L 63/0227 |
| 9,882,767 B1* | 1/2018 | Foxhoven | ........... | H04L 61/4552 |
| 9,935,955 B2* | 4/2018 | Desai | ...................... | H04L 67/02 |
| 10,044,719 B2* | 8/2018 | Desai | ...................... | H04L 63/20 |
| 10,142,362 B2* | 11/2018 | Weith | ...................... | H04L 63/20 |
| 10,148,686 B2* | 12/2018 | Hassanzadeh | ...... | H04L 63/1441 |
| 10,333,988 B2* | 6/2019 | Porras | ................... | H04L 63/107 |
| 10,659,450 B2* | 5/2020 | Sridhar | .................. | H04L 67/10 |
| 2003/0028616 A1* | 2/2003 | Aoki | ...................... | H04L 67/1001 709/217 |
| 2005/0198351 A1* | 9/2005 | Nog | ........................ | H04L 67/63 709/238 |
| 2014/0259093 A1* | 9/2014 | Narayanaswamy | .... | H04L 63/08 726/1 |
| 2015/0012664 A1* | 1/2015 | Johnson | .................. | H04L 45/72 709/238 |
| 2016/0359807 A1* | 12/2016 | Buruganahalli | ........ | H04L 63/20 |
| 2018/0309795 A1* | 10/2018 | Ithal | ...................... | H04L 63/029 |
| 2020/0067989 A1* | 2/2020 | Walter | .................... | H04L 63/10 |
| 2020/0143300 A1* | 5/2020 | Weldemariam | .... | G06Q 10/0635 |

* cited by examiner

SECURITY AND SAFETY OF AN INDUSTRIAL OPERATION USING OPPORTUNISTIC SENSING

BACKGROUND INFORMATION

The subject matter disclosed herein relates to security and safety of an industrial operation and more specifically to using opportunistic sensing for security and safety of an industrial operation.

BRIEF DESCRIPTION

A method for security and safety of an industrial operation is disclosed. A component and a computer program product also perform the functions of the method. The method includes receiving sensor information from a plurality of sensors of an industrial operation. Sensor information from at least a portion of the plurality sensors is used for functionality of a plurality of components of the industrial operation. The method includes monitoring data traffic of the industrial operation, and deriving a baseline signature from the sensor information. The baseline signature encompasses a range of normal operating conditions. The method includes identifying an abnormal operating condition of the industrial operation based on a comparison between additional sensor information from the plurality of sensors and the baseline signature and identifying an abnormal data traffic condition. The method includes determining that the abnormal operating condition correlates to the abnormal data traffic condition, and sending a security alert in response to determining that the abnormal operating condition correlates to the abnormal data traffic condition.

A component for safety and security of an industrial operation includes a sensor module configured to receive sensor information from a plurality of sensors of an industrial operation. Sensor information from at least a portion of the plurality sensors is used for functionality of a plurality of components of the industrial operation. The component includes a data monitor module configured to monitor data traffic of the industrial operation and a baseline module configured to derive a baseline signature from the sensor information. The baseline signature encompasses a range of normal operating conditions. The component includes an abnormal operation module configured to identify an abnormal operating condition of the industrial operation based on a comparison between additional sensor information from the plurality of sensors and the baseline signature, and an abnormal data module configured to identify an abnormal data traffic condition. The component includes a correlation module configured to determine that the abnormal operating condition correlates to the abnormal data traffic condition, and an alert module sending an alert in response to determining that the abnormal operating condition correlates to the abnormal data traffic condition. At least a portion of the modules include one or more of hardware circuits, a programmable hardware device and program code. The program code stored on one or more computer readable storage media.

A computer program product for safety and security of an industrial operation includes a computer readable storage medium having program code embodied therein. The program code is executable by a processor to receive sensor information from a plurality of sensors of an industrial operation. Sensor information from at least a portion of the plurality sensors is used for functionality of a plurality of components of the industrial operation. The program code is executable by a processor to monitor data traffic of the industrial operation, and derive a baseline signature from the sensor information. The baseline signature encompasses a range of normal operating conditions. The program code is executable by a processor to identify an abnormal operating condition of the industrial operation based on a comparison between additional sensor information from the plurality of sensors and the baseline signature, and identify an abnormal data traffic condition. The program code is executable by a processor to determine that the abnormal operating condition correlates to the abnormal data traffic condition, and send a security alert in response to determining that the abnormal operating condition correlates to the abnormal data traffic condition.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising." "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

A module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like. Modules may also be implemented in program code and/or software for execution by various types of processors. An identified module of program code may include one or more physical or logical blocks of executable code which may be organized as an object, procedure, or function. Executables of a module need not be physically located together.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device. The computer readable storage described herein is non-transitory while storing data but may be accessed for reading and writing data with transitory signals.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for security and safety of an industrial operation is disclosed. A component and a computer program product also perform the functions of the method. The method includes receiving sensor information from a plurality of sensors of an industrial operation. Sensor information from at least a portion of the plurality sensors is used for functionality of a plurality of components of the industrial operation. The method includes monitoring data traffic of the industrial operation, and deriving a baseline signature from the sensor information. The baseline signature encompasses a range of normal operating conditions. The method includes identifying an abnormal operating condition of the industrial operation based on a comparison between additional sensor information from the plurality of sensors and the baseline signature and identifying an abnormal data traffic condition. The method includes determining that the abnormal operating condition correlates to the abnormal data traffic condition, and sending a security alert in response to determining that the abnormal operating condition correlates to the abnormal data traffic condition.

In some embodiments, the abnormal data traffic condition includes a change in data traffic beyond a data traffic threshold and determining that the abnormal operating condition correlates to the abnormal data traffic condition includes correlating timing of the abnormal data traffic condition with the abnormal operating condition. In further embodiments, the change in data traffic is from a source external to the industrial operation. In other embodiments, the change in data traffic is from a node added to the industrial operation for data access within a threshold amount of time prior to the abnormal operating condition.

In some embodiments, identifying the abnormal data traffic condition and determining that the abnormal operating condition correlates to the abnormal data traffic condition includes determining that one or more firmware updates to one or more components of the industrial operation occurred prior to the abnormal operating condition and the one or more firmware updates are correlated in time with the abnormal operating condition. In other embodiments, the one or more firmware updates were installed from an external node accessing equipment of the industrial operation. In other embodiments, the method includes receiving commands used to control the industrial operation. The baseline signature includes sensor information from the plurality of sensors for a normal operating condition correlated with commands related to the normal operating condition. In other embodiments, monitoring the data traffic includes monitoring data sent to a display of operating parameters of the industrial operation and identifying the abnormal data traffic condition and determining that the abnormal operating condition correlates to the abnormal data traffic condition include determining that the data sent to the display conflicts with sensor information of the identified abnormal operating condition.

In some embodiments, deriving the baseline signature includes using a machine learning algorithm to derive the baseline signature. In other embodiments, portions of the baseline signature are distributed among a plurality of devices in the industrial operation in a blockchain format and updates to the baseline signature are stored using a blockchain. In other embodiments, the plurality of sensors are spread across a majority of the components of the industrial operation.

A component for safety and security of an industrial operation includes a sensor module configured to receive sensor information from a plurality of sensors of an industrial operation. Sensor information from at least a portion of the plurality sensors is used for functionality of a plurality of components of the industrial operation. The component includes a data monitor module configured to monitor data traffic of the industrial operation and a baseline module configured to derive a baseline signature from the sensor information. The baseline signature encompasses a range of normal operating conditions. The component includes an abnormal operation module configured to identify an abnormal operating condition of the industrial operation based on a comparison between additional sensor information from the plurality of sensors and the baseline signature, and an abnormal data module configured to identify an abnormal data traffic condition. The component includes a correlation module configured to determine that the abnormal operating condition correlates to the abnormal data traffic condition, and an alert module sending an alert in response to determining that the abnormal operating condition correlates to the abnormal data traffic condition. At least a portion of the modules include one or more of hardware circuits, a programmable hardware device and program code. The program code stored on one or more computer readable storage media.

In some embodiments, the abnormal data traffic condition includes a change in data traffic above a data traffic threshold and determining that the abnormal operating condition correlates to the abnormal data traffic condition includes correlating timing of the abnormal data traffic condition with the abnormal operating condition. In other embodiments, identifying the abnormal data traffic condition and determining that the abnormal operating condition correlates to the abnormal data traffic condition includes determining that one or more firmware updates to one or more components of the industrial operation occurred prior to the abnormal operating condition and the one or more firmware updates are correlated in time with the abnormal operating condition.

In some embodiments, the change in data traffic is from a source external to the industrial operation. In other embodiments, the change in data traffic is from a node added to the industrial operation for data access within a threshold amount of time prior to the abnormal operating condition. In other embodiments, the one or more firmware updates were installed from an external node accessing equipment of the industrial operation. In other embodiments, the component includes a command module configured to receive commands used to control the industrial operation. The baseline signature includes sensor information from the plurality of sensors for a normal operating condition correlated with commands related to the normal operating condition.

In further embodiments, the data monitor module monitoring the data traffic includes a display traffic module configured to monitor data sent to a display of operating parameters of the industrial operation and the abnormal data module identifying the abnormal data traffic condition and the correlation module determining that the abnormal operating condition correlates to the abnormal data traffic condition include determining that the data sent to the display conflicts with sensor information of the identified abnormal operating condition. In other embodiments, portions of the baseline signature are distributed among a plurality of devices in the industrial operation in a blockchain format and updates to the baseline signature are stored using a blockchain.

A computer program product for safety and security of an industrial operation includes a computer readable storage medium having program code embodied therein. The program code is executable by a processor to receive sensor information from a plurality of sensors of an industrial operation. Sensor information from at least a portion of the plurality sensors is used for functionality of a plurality of components of the industrial operation. The program code is executable by a processor to monitor data traffic of the industrial operation, and derive a baseline signature from the sensor information. The baseline signature encompasses a range of normal operating conditions. The program code is executable by a processor to identify an abnormal operating condition of the industrial operation based on a comparison between additional sensor information from the plurality of sensors and the baseline signature, and identify an abnormal data traffic condition. The program code is executable by a processor to determine that the abnormal operating condition correlates to the abnormal data traffic condition, and send a security alert in response to determining that the abnormal operating condition correlates to the abnormal data traffic condition.

In some embodiments, the abnormal data traffic condition includes a change in data traffic above a data traffic threshold and determining that the abnormal operating condition correlates to the abnormal data traffic condition includes correlating timing of the abnormal data traffic condition with the abnormal operating condition. In other embodiments, identifying the abnormal data traffic condition and determining that the abnormal operating condition correlates to the abnormal data traffic condition includes determining that one or more firmware updates to one or more components of the industrial operation occurred prior to the abnormal operating condition and the one or more firmware updates are correlated in time with the abnormal operating condition.

Figure 1:
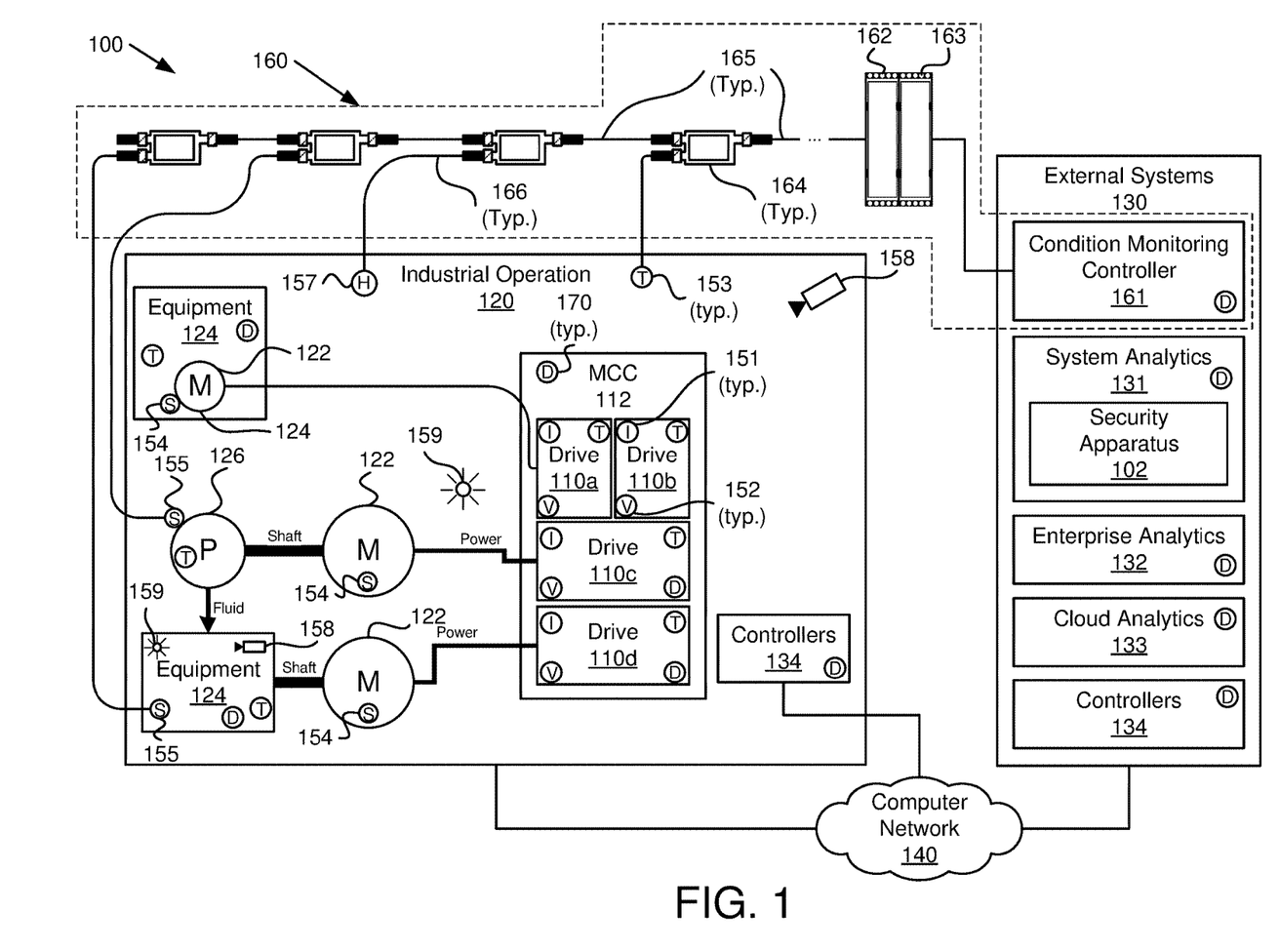
FIG. 1 is a schematic block diagram illustrating one embodiment of an industrial automation environment for security and safety of an industrial operation.

FIG. 1 is a schematic block diagram illustrating one embodiment of an industrial automation environment 100 for security and safety of an industrial operation. The industrial automation environment ("environment") 100 includes a security apparatus 102, drives 110a-110d (individually or generically "110") in a motor control center ("MCC") 112, an industrial operation 120, external systems 130, and an external condition monitoring system 160. The industrial operation 120 depicted in FIG. 1 includes machines 122, industrial equipment 124, and a pump 126. External systems 130 include system analytics 131 with the security apparatus 102, enterprise analytics 132, cloud analytics 133, and programmable logic controller ("PLC") automation controllers 134.

The industrial operation 120 represents any industrial machine or system which includes various components, such as machines 122 that are rotating machines, which may be powered by a drive 110. The components of the drive 110, MCC 112 and the industrial operation 120 differ depending on a given implementation and machine type. Systems shown herein typically include additional components, fewer components, and different components and are still in accordance with the technology of the present embodiments. The external systems 130 serve to represent or include any layer of an industrial automation equipment where external analytics collect and analyze data from the industrial operation 120.

The security apparatus 102 receives sensor information from various sensors 151-159 (generically "150") of the industrial automation environment 100 where at least some of the sensors 150 (component sensors) are used for functionality of a component and additional sensors are for functionality of another component, are placed as more general purpose sensors, are sensors that don't have a specific purpose, etc. The additional sensors may include temperature sensors 153, humidity sensors 157, current sensors 151, etc. The security apparatus 102 repurposes sensor information from the various sensors 150 in an opportunistic sensing application.

Data breaches of industrial systems are becoming increasingly common. Some data breaches are used to disrupt industrial operations, which may cause loss of revenue, damage to equipment, or even worse, injury to personnel. Some data breaches of industrial operations are often called industrial espionage and may come from hostile nations or competitors. Some data breaches attempt to change component operation by commanding the component to act in a different way than commanded. Information going to a display of an operator may be intercepted and changed so that operators believe that all is well while components of the industrial operation are destroyed.

The security apparatus 102 receives sensor information from a plurality of sensors 150 used for the functionality of components (e.g. 110, 112, 134, 122, 124, 126) of the industrial operation 120 and also monitors, with data sensors 170, data traffic of the industrial operation 120. The security apparatus 102 derives a baseline signature from the sensor information of the sensors 150 where the baseline signature is for a range of normal operating conditions. The security apparatus 102 compares additional sensor information with the baseline signature to identify an abnormal operating condition along with an abnormal data traffic condition. The security apparatus 102 determines if there is a correlation between the abnormal operating condition and the abnormal data traffic condition and sends a security alert in response to determining that the abnormal operating condition correlates to the abnormal data traffic condition. The security apparatus 102 is described in more detail with regard to the apparatuses 200, 300 of FIGS. 2 and 3. Advantageously, the security apparatus 102 uses opportunistic sensing to create a baseline signature that is difficult to duplicate and that can be used to identify abnormal operating conditions. Correlated abnormal data traffic conditions can be used to identify a security problem, which can be sent out in an alert.

The sensors 150 include component sensors and other additional sensors. Generally, component sensors are used to operate or manage a component of the industrial operation 120. For example, a drive 110 may include current and voltage sensors 151, 152 or other sensors as component sensors used to operate the drive 110. Other additional sensors may be present and may or may not be used for operating the component. For example, a temperature sensor 153 may be used to sense high temperatures in a microcontroller of the drive 110 and may be used to manage the microcontroller but may not be used to control the drive 110. Vibration sensors may be added to a rotating machine 122 controlled by the drive 110 for vibration analysis of bearings and thus may not be used to manage operation of the rotating machine 122 but instead may be used to identify failures.

Sensor information may be exported from various components, such as the machine 122, drive 110, etc. to the security apparatus 102. Current and/or voltage sensors 151, 152 may be correlated to various operating parameters of a rotating machine 122, such as low load, full load, overload, may be correlated to various operational parameters such as motor speeds, etc. and sensor information from the sensors 151, 152 may then be used to identify an abnormal operating condition that affects a predicted operational lifetime of the rotating machine 122. Vibration data, temperature data, etc. may also be correlated to an operating parameter of the rotating machine 122.

The industrial operation 120 is depicted with drives 110a-d (e.g. 110) in a motor control center 112 and connected to various devices, such as machines 122 which drive or power equipment 124, pumps 126, etc. The machines 122, in some embodiments, are rotating machines or motors. The equipment 124 includes devices typically found in an industrial operation 120, such as equipment on an assembly line, equipment used for processing raw materials, manufacturing equipment, etc. A pump 126 is depicted and is representative of a device driven by a rotating machine 122. The machines 122, equipment 124, pumps 126 and other devices and/or components in an industrial operation 120 include sensors 150 of various types and for various purposes. In addition, an industrial operation 120 may include other sensors 150 mounted external to the devices of the industrial operation 120, such as temperature sensors 153 to measure ambient temperature, access control sensors, and the like. While an industrial operation 120 is depicted, embodiments described herein may include other environments, such as a data center, or other facility with equipment that include sensors for various purposes and where sensor information is available to be repurposed to identify correlations and trends in the sensor information to identify abnormal conditions.

In embodiments with variable frequency drives ("VFDs") and rotating machines, the drive 110 may be a VFD which supplies power to a rotating machine 122 of the industrial operation 120 while controlling speed of the rotating machine 122 and receives signal data from the industrial operation 120. An analytic engine in a drive 110, in some embodiments, runs a fault detection process to detect faults within the industrial operation 120 based on the signal data.

The drives 110 may also be motor starters or other types of motor controllers that are not VFDs.

The industrial automation environment 100, in some embodiments, includes an external condition monitoring system 160 with a condition monitoring controller 161 where the external condition monitoring system 160 is external to equipment 122-126 and drives 110 of the industrial operation 120. The external condition monitoring system 160, in some embodiments, includes a safety relay 162, a network interface 163, connection taps 164, trunk line conductors 165, and tap conductors 166, and may be connected to various devices and sensors 150 for condition monitoring. The condition monitoring may be for safety, for access control, or the like.

In some embodiments, the external condition monitoring system 160 includes a network interface 163 connected to a safety relay 162. The network interface 163 provides a network connection to the condition monitoring controller 161. For example, the external condition monitoring system 160 may include one internet protocol ("IP") address and may be able to provide information from safety devices through the single IP address to the condition monitoring controller 161. Such an arrangement beneficially reduces the number of IP addresses for a plant with one or more industrial operations 120. Other networking interfaces 163 may include more than one IP address, for example, for multiple safety relays 162 or multiple lines from a safety relay 162. In addition to the sensors, the external condition monitoring system 160 may include other safety devices, such as a non-contact switch, a light curtain, a locking switch, an emergency stop, a light curtain, an actuator, a cable pull switch, a key interlock switch, and the like. In other embodiments, one or more sensors 150 and/or safety devices include an IP address. In other embodiments, the external sensors and/or safety devices run on a proprietary network different than an IP network. In other embodiments, the external sensors connect directly to the condition monitoring controller 161.

The industrial automation environment 100 includes various sensors 150 placed for different purposes. The plurality of sensors 150 sense one or more of temperature, vibration, current, voltage, motion, acoustic noise, strain, movement, odor, pressure, number of uses of the component, magnetic flux, electromagnetic interference, pH, chemical content in air around the component, data packet loss and/or humidity. Over time, sensors have become less expensive, and thus equipment of an industrial operation 120 or in an industrial automation environment 100 include more sensors than previous equipment. For example, where traditional starters, drives, etc. have included current and voltage sensors 151, 152, additional sensors may be included, such as temperature sensors 153, vibration sensors, etc. A temperature sensor 153, vibration sensor or other sensor in a starter, drive 110, etc. may be used to monitor device health, abnormal conditions, may be used for feedback and control, etc. In some components, devices, equipment, systems, etc., sensors 150 may be included that do not have a defined purpose. For example, a device may include a microcontroller that includes various sensors and some of which may not be used in the device but may have been included because the microcontroller includes certain sensors in a standard design. In addition, equipment of an industrial automation environment 100 increasingly are connected to a computer network so that information from the equipment and sensors 150 is available for analysis. Often, equipment of an industrial operation 120 provide so much information that customers are not sure what to do with the information.

Sensor information from the sensors 150 and equipment in the embodiments described herein may be used for opportunistic sensing. Opportunistic sensing takes advantage of available sensor information where the sensor information may then be used for multiple purposes. For example, a drive 110 may use current and voltage sensors for controlling a machine 122, for overload protection, for opening contacts based on overcurrent, etc. Where a temperature sensor 153 is also included in a drive 110, temperature sensor information as an operational parameter affects a predicted operational lifetime of the drive 110 when the temperature is beyond certain limits, is high for a prolonged period of time, etc.

Some of the sensors 150 that may be included in the industrial automation environment 100 include current sensors 151, voltage sensors 152, temperature sensors 153, internal sensors 154 that are integral with components, such as rotating machines 122, external sensors 155 which are external to components and may be added after manufacture or after installation. The internal and external sensors 154, 155 may include vibration sensors, acoustic sensors, and the like. Other sensors 150 that may be included include humidity sensors 157, optical sensors 158, motion sensors 159, and the like. In the embodiments described herein, data sensors 170 may also be included. While various sensors 150, 170 are depicted in FIG. 1, one of skill in the art will recognize other sensors that may be included in an industrial automation environment 100.

All of the sensors 150, 170 described herein have an ability to export sensor information to the security apparatus 102, such as through the computer network 140. Some sensors 150, 170 are connected directly to the computer network 140, such as through a component in which they are embedded. Other sensors 150, 170 have a wireless connection. Other sensors 150, 170 provide sensor information to another device and the other device exports the sensor data to the computer network 140. For example, a rotating machine 122 may transmit sensor information to a drive 110 and the drive 110 exports the sensor information. While a single line is depicted from the computer network 140 to the industrial operation 120, the single line represents multiple network connections.

The current sensors 151 and voltage sensors 152, in various embodiments, may be embedded in equipment, such as a drive 110, a circuit breaker, a motor starter, etc. and may be used for functionality of the equipment but also have the ability to export sensor information. In other embodiments, the current and voltage sensors 151, 152 are external to the equipment. For example, a current sensor 151 may include a current transformer placed around one or more conductors in the industrial operation 120.

Likewise, the temperature sensors 153 may be internal or external to components. For example, a temperature sensor 153 may be embedded in a microprocessor where sensor information from the temperature sensor 153 may be used to monitor a processor, a core, memory, etc. and the sensor information is also available to be exported for other purposes. Increasingly, the components of an industrial operation 120 include microprocessors, which may include various sensors 150, 170 capable of exporting sensor information. In other embodiments, the temperature sensors 153 are mounted in strategic locations for use by equipment of an industrial operation 120. For example, a temperature sensor 153 may be placed in a workspace, in an enclosure, etc. to monitor ambient temperature conditions. In other embodiments, a temperature sensor 153 may be placed in an enclosure that includes other equipment, such as in a bucket of an MCC 112, but external to a drive 110. One of skill in the art will recognize other locations and uses of a temperature sensors 153.

The internal sensors 154 are described as internal in that the internal sensors 154 are included with components and provide sensor information through communication channels of the components. For example, a machine 122, such as a motor, may include a sensor that transmits sensor information to a drive 110 and the sensor information is then available at the drive 110. The external sensors 155 are described as external in that the external sensors 155 are not integral with the machines 122 and/or drives 110.

The term "external sensor" and "internal sensor" are used merely to connote that the external sensors 155 are connected to the external condition monitoring system 160 or other system and the internal sensors 154 are built into machines 122 or other components and may provide sensor information to the drives 110 and "internal" versus "external" are not used herein to describe actual location of the sensors 154, 155 with respect to components. In some embodiments, sensor information from the external sensors 155 complement sensor information from the internal sensors 154 and may facilitate locating an abnormal operating condition. For example, vibration data from an external vibration sensor 155 in a pump 126 along with vibration data from an internal sensor 154 in a connected machine 122 may be used to determine if the source of the vibration is in the pump 126 or machine 122. The internal and external sensors 154, 155 may be any type of sensor 150. Note that "sensor 150" includes other sensors not specifically depicted in FIG. 1.

In some embodiments, the industrial automation environment 100 includes one or more internal or external sensors 154, 155 which are vibration sensors located in various equipment (e.g. 125, 126) of the industrial operation 120. The vibration sensors, in some embodiments, are positioned to detect vibration in bearings, bearing races, belts, gears, and the like, to detect cavitation in the pump 126 or other potential sources of vibration. In other embodiments, the external condition monitoring system 160 includes acoustic sensors to detect sound caused by vibration or other problem noises. In some embodiments, the acoustic sensors can be used to detect vibrations. For example, an acoustic sensor may be used to detect vibrations associated with various modes of bearing failure, such as bearings in a rotating machine 122. Some vibrations are in the 20-40 kHz range or even higher and an acoustic sensor may be useful to detect the higher frequency vibrations. One of skill in the art will recognize other equipment and locations in the industrial operation 120 to monitor with a vibration sensor, acoustic sensors, etc. The vibration sensors may be accelerometers, may be piezoelectric sensors, such as integrated circuit piezoelectric ("ICP") industrial accelerators, etc. In some embodiments, the sensors 150 are dual output sensors, which may measure two parameters such as vibration and temperature.

In some embodiments, the industrial automation environment 100 includes one or more humidity sensors 157 to monitor humidity in or around the industrial operation 120. In other embodiments, the external condition monitoring system 160 includes one or more temperature sensors 153 to monitor temperature in or around the industrial operation 120. In other embodiment, one or more temperature sensors 153 are located inside equipment. Abnormal temperature may increase equipment failures. In other embodiments, the external condition monitoring system 160 includes other sensors 150, such as chemical sensors, to monitor conditions in the industrial operation 120. One of skill in the art will recognize other sensors 150 useful by the security apparatus 102 to predict abnormal conditions.

In some embodiments, the industrial automation environment 100 includes one or more optical sensors 158. Optical sensors 158 include various types of sensors, such as cameras, sensors that detect a break in a beam of light, and the like. For example, a camera may detect motion, may detect personnel, may detect movement of equipment such as a forklift, etc., which is helpful in determining where certain vibrations are coming from, when personnel are affecting a machine, etc. A beam detector may be used to determine when personnel have opened a compartment, etc. A beam detector may be used to detect smoke or other airborne particles. The optical sensors 158 thus are helpful in determining abnormal conditions as well as when normal operations are being affected so that derivation of a baseline signature may be halted until normal conditions occur.

In some embodiments, the industrial automation environment 100 includes one or more motion sensors 159. The motion sensors 159, in some embodiments, detect motion of any type in a particular location. In other embodiments, the motion sensors 159 detect motion, direction, velocity, etc. in a three-dimensional space, which can be useful in determining if personnel or equipment is moving towards equipment 124, machines 122, etc. The motion sensors 159 may also be correlated to an operating parameter tied to operational lifetime. For example, abnormal movement of a component may decrease the predicted operational lifetime of the component.

In some embodiments, the industrial automation environment 100 includes data sensors 170. Data sensors 170 monitor data traffic for a particular component, controller, sensor 150, or other device that sends and receives data. A data sensor 170, in some embodiments, monitors an amount of data packets sent to a device, monitors data sent by a device or both. The data sensor 170, in other embodiments, monitors where the data came from, such as another device in the industrial automation environment 100 or from an external source. Data from an external source may be used to determine if an external entity is attempting to gain access to a device for some reason, such as disrupting the industrial operation 120 or gaining information to do so. Sensor information from a data sensor 170, in some embodiments, is exported for use with the security apparatus 102.

The external systems 130 are depicted outside the industrial operation 120 to signify that information from the MCC 112, drives 110, machines 122, equipment 124, pumps 126, external condition monitoring system 160, etc. export information. In some embodiments, the external systems 130 are located at a different site than the industrial operation 120. In other embodiments, the external systems 130 are collocated with the components of the industrial operation 120 and external condition monitoring system 160. Typically, the external systems 130 provide higher level control and analysis not available in the components of the industrial operation 120 and external condition monitoring system 160. In some embodiments, the external systems 130 have higher computing capabilities than many of the component of the industrial operation 120 and external condition monitoring system 160.

The drives 110, in some embodiments, include an analytics engine. While the analytics engine may be in communication with any analytics system of the external systems 130, for some types of faults/failures the analytics engine does not require external systems 130 to perform fault analysis. The analytics engine uses sensor information from the drive 110 and/or machine 122 to determine that a fault or failure has occurred and information about certain faults or failures is fed to the external systems 130. In some embodiments, the raw sensor information is also made available past the analytics engine to the security apparatus 102.

In some examples, an enterprise may use the analytic engine as one component of a greater condition monitoring and analysis system within the enterprise. In other embodiments, the security apparatus 102 uses raw sensor information from the drives 110 or machine 122. A modular topology may utilize the analytic engine at the device level in addition to processes and analyses performed at the system and enterprise level, such as condition monitoring by the external condition monitoring system 160. At the device level, the analytic engine may collect data from internal sensors 154 of devices of the industrial operation 120 and other sources in various formats.

The analytics engine may use collected data to perform condition monitoring, power and energy monitoring, predicted life analysis, load characterization, or similar analyses. At the system level, system analytics 131 may aggregate and contextualize information to detect system level fault conditions and/or provide insights related to preventative maintenance, energy diagnostics, system modeling, performance optimization, and similar insights. The security apparatus 102, in some embodiments, furthers functionality of the system analytics 131.

At the enterprise level, enterprise analytics 132, cloud analytics 133, or a combination thereof may work together with the security apparatus 102 to present information to users on devices and systems including mobile devices and desktop computers to enable remote learning, machine learning, and root cause analysis. Specifically, the security apparatus 102 may use information from the analytic engine and from the condition monitoring controller 161 to predict and detect abnormal operating conditions, such as impending failures or other condition that differs from the baseline signature, and then correlate the abnormal operating condition with an abnormal data traffic condition, which may signify an external source is causing the abnormal operating condition. In FIG. 1 the security apparatus 102 is depicted in the system analytics 131, but may reside in the enterprise analytics 132, condition monitoring controller 161, a server, a cloud computing environment, or other convenient location.

The computer network 140 may be wired, wireless or a combination of both. The computer network 140 may include a local area network ("LAN"), a wide area network ("WAN"), a fiber optic network, a proprietary network, the Internet, a wireless connection, and/or the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an optical connections and may be an infrared connection including connections such as the Infrared Physical Layer Specification ("IrPHY") as defined by the Infrared Data Association® (IrDA®). Alternatively, the wireless connection may include a cellular telephone network communication. All standards and/or connection types include the latest version and revision of the standard and/or connection type as of the filing date of this application.

Figure 2:
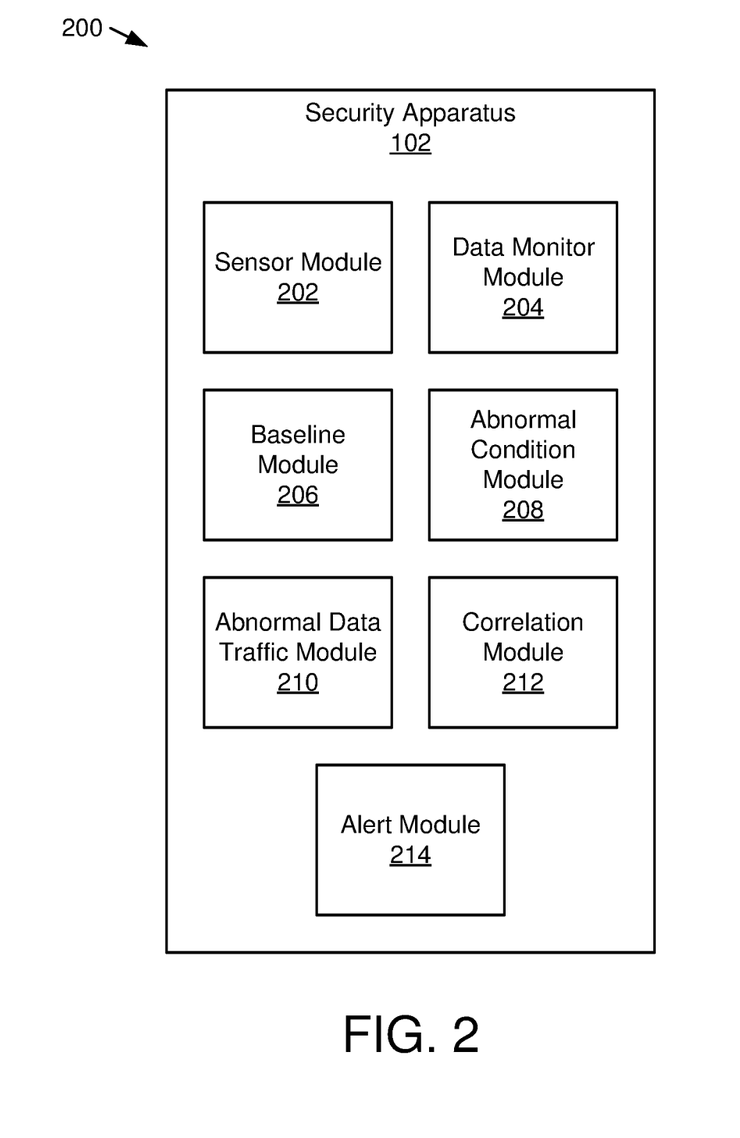
FIG. 2 is a schematic block diagram illustrating one embodiment of an apparatus for security and safety of an industrial operation.

FIG. 2 is a schematic block diagram illustrating one embodiment of an apparatus 200 for security and safety of an industrial operation. The apparatus 200 includes an embodiment of the security apparatus 102 that includes a sensor module 202, a data monitor module 204, a baseline module 206, an abnormal condition module 208, an abnormal data traffic module 210, a correlation module 212, and an alert module 214, which are described below. The apparatus 200, in some embodiments, is implemented with program code stored on computer readable storage media, which is non-transitory. The program code is executable by a processor, such as a server executing program code of the system analytics 131. In other embodiments, the apparatus 200 is implemented in a controller. For example, the controller may be in a MCC 112, drive 110 or other device. The controller may include program code and may also be implemented completely or partially with hardware circuits. In some embodiments, the apparatus 200 is implemented completely or partially with a programmable hardware device, such as an FPGA. For example, the apparatus 200 may be implanted as a controller as an FPGA where some elements of the apparatus 200 are implemented with hardware circuits, such as the sensor module 202 that may have some hardware connections to sensors 150. One of skill in the art will recognize other ways to implement the apparatus 200.

The apparatus 200 includes a sensor module 202 configured to receive sensor information from a plurality of sensors 150 of an industrial operation 120. Sensor information from at least a portion of the plurality sensors 150 is used for functionality of a plurality of components of the industrial operation. Other sensors of the plurality of sensors 150 may be general purpose sensors or other sensor not placed for any particular purpose. For example, a processor of a controller 134, drive 110, etc. may include sensors that are not used for the functionality of the controller 134, drive 110, etc. but have the capability of providing sensor information useful to the security apparatus 102. The sensor module 202 provides sensor information to the security apparatus 102 in addition to use by a component where the sensors 150 are located. For example, a drive 110 may include a current sensor 151 that provides information for functionality of the drive 110, such as feedback, fault analysis, etc., and provides sensor information to that is received by the sensor module 202.

The apparatus 200 includes a data monitor module 204 configured to monitor data traffic of the industrial operation 120. The data monitor module 204, in some embodiments, receives sensor information from the data sensors 170. In other embodiments, the data monitor module 204 includes program code embedded in a component that enables monitoring of the data traffic of the component and sends data traffic information to the security apparatus 102. In other embodiments, the data monitor module 204 monitors data traffic by monitoring a switch, router, etc. In some embodiments, the data sensors 170 monitor data traffic. In other embodiments, the data sensors 170 monitor a volume of data being transferred.

In some embodiments, the data sensors 170 and/or data monitor module 204 monitor data types. For example, a data sensor 170 and/or the data monitor module 204 may monitor when a new node is added, when there is a request to verify identity or when there is a failure to verify identity accompanied by a retry to re-input credentials. In other embodiments, the data sensors 170 and/or data monitor module 204 monitor button pushes, data sent to an electronic display, etc. For example, the data sensors 170 and/or data monitor module 204 may monitor data sent to a display of an operator while the plurality of sensors 150 may monitor operations associated with the data sent to the display. In other embodiments, the data sensors 170 and/or data monitor module 204 monitor software updates, such as updating of firmware or data files being uploaded for a software update.

The data sensors 170 may be included in any component, computer, controller 134, etc. of the industrial automation environment 100 and the data monitor module 204 may then receive data traffic information from the various components, computers, controllers 134, etc. In some embodiments, a data sensor 170 and/or a portion of the data monitor module 204 may monitor data traffic of a component where the data sensor 170 is not located near the component but is instead located somewhere in a data path to the component. In other embodiments, the data sensor 170 for a component is located in or near the component. One of skill in the art will recognize other ways for the data monitor module 204 and associated data sensors 170 to monitor data traffic of various forms of various components, computers, controllers 134, etc. of the industrial automation environment 100.

The apparatus 200 includes a baseline module 206 configured to derive a baseline signature from the sensor information from the plurality of sensors 150. The baseline signature encompasses a range of normal operating conditions. The industrial operation 120 includes numerous components, computers, controllers 134, etc. that operate under different operating conditions that would be considered normal operation. Each normal operating condition has an associated set of data points from the sensor information of the sensors 150 which is stored and used to derive the baseline signature. The baseline signature includes ranges of operation that are considered normal for the various rotating machines 122, equipment 124, pumps 126, controllers 134, drives 110, and other components. The normal operating conditions may include some components being idle, others being operated at full load, others being operated at partial load, etc. The normal operating conditions also include processing of different types of materials, include different environmental conditions, such as higher or lower seasonal temperatures, etc.

The baseline module 206 creates the baseline signature using the various normal operating conditions and, in some embodiments, stores the baseline signature in a secure way. In some embodiments, the baseline module 206 stores the baseline signature in distributed leger in various locations. In some embodiments, the baseline module 206 uses a blockchain to store the distributed leger for data security reduce an ability to manipulate the baseline signature. For example, a new block may be created with data from a current operating condition and may be stored with a hash of data from a previous operating condition and the block is stored in a leger. Advantageously, if an intruder tries to modify data of a particular component or a group of components, the changes can be detected and flagged. Using opportunistic sensing of sensors 150 for a large portion or all of the industrial automation environment 100 helps to create a baseline signature and the using a distributed leger and blockchain to protect the baseline signature makes it difficult to make changes to a portion of the sensor information and/or baseline signature.

In some embodiments, the baseline module 206 creates multi-dimensional ranges, shapes, etc. representing the variations of the different sensors 150 during normal operation. In some embodiments, the baseline module 206 creates equations to represent the baseline signature. The equations may be in various forms, such as linear algebra equations with matrices. In other embodiments, the baseline module 206 uses interpolation or extrapolation to cover areas between discrete points. In some embodiments, the baseline module 206 uses steady-state data points for the baseline signature and excludes transient data. In other embodiments, the baseline module 206 creates the baseline signature during a training period where conditions are monitored to ensure that normal operating conditions are present in the industrial automation environment 100. One of skill in the art will recognize other ways for the baseline module 206 to create a baseline signature from the sensor information of the plurality of sensors 150 during normal operations.

The apparatus 200 includes an abnormal condition module 208 configured to identify an abnormal operating condition of the industrial operation 120 based on a comparison between additional sensor information from the plurality of sensors 150 and the baseline signature. The abnormal operating condition occurs when operating conditions for at least one component of the industrial automation environment 100 are not as expected for current operating conditions and are a departure from the baseline signature. In some embodiments, the abnormal condition module 208 identifies an abnormal operation based on a trend away from the baseline signature. For example, the abnormal condition module 208 may identify that sensor information from one or more sensors 150 vary from the baseline signature in an abnormal way, such as temperatures being higher than a normal temperature range, current being higher than expected for commanded operating conditions, etc.

In other embodiments, the abnormal condition module 208 identifies an abnormal operating condition based on a comparison between the sensor information and one or more operational thresholds. In some examples, an operational threshold is a specified amount away from a normal operating range or point. In other embodiments, the abnormal condition module 208 uses operational thresholds appropriate for current operating conditions. For example, the abnormal condition module 208 may use one operational threshold for a drive 110 at 50 percent load and another operational threshold for the drive 110 at full load.

In some embodiments, the baseline module 206 stores data traffic from the data sensors 170 along with other sensor information from the plurality of sensors 150. For example, the baseline module 206 may include sensor information from the data sensors 170 in the baseline signature. The recorded sensor information from the data sensors 170 and/or data monitor module 204 may include data traffic levels, data commands, data volume, information about a new node, login attempts, and the like. As used herein, data traffic includes any digital information collected by the data sensors 170 and/or data monitor module 204. Storing data traffic from the data sensors 170 with other operating conditions from the sensors 150 of the industrial automation environment 100 provides a database for determining if there is an abnormal data traffic condition. One of skill in the art will recognize other ways for the abnormal condition module 208 to identify an abnormal operating condition based on a comparison between the baseline signature and additional sensor information not used for derivation of the baseline signature.

The apparatus 200 includes an abnormal data traffic module 210 configured to identify an abnormal data traffic condition. In some embodiments, the abnormal data traffic condition includes an abnormal amount of data traffic, such as data traffic above an expected amount from similar operating conditions, data volume levels above expected data volume levels, etc. In some examples, the abnormal data traffic condition includes a change in data traffic beyond a data traffic threshold and the correlation module 212 determining that the abnormal operating condition correlates to the abnormal data traffic condition includes correlating timing of the abnormal data traffic condition with the abnormal operating condition. The change in data traffic beyond the data traffic threshold may be an increase in data traffic above an upper data traffic threshold or a decrease in data traffic below a lower data traffic threshold. In another embodiment, the change in data traffic includes a delay in data traffic more than a data threshold amount of time. In some examples, the change in data traffic is from a source external to the industrial operation 120. In other examples, an abnormal data traffic condition includes data traffic from a newly added node. In some examples, an change in data traffic is from a node added to the industrial operation 120 for data access within a threshold amount of time prior to the abnormal operating condition.

In other examples, an abnormal data traffic condition includes repeated login attempts from an external source. In other examples, an abnormal data traffic condition includes a recent firmware update. For example, the abnormal data traffic module 210 identifying the abnormal data traffic condition and the correlation module 212 determining that the abnormal operating condition correlates to the abnormal data traffic condition includes determining that one or more firmware updates to one or more components of the industrial operation occurred prior to the abnormal operating condition and the one or more firmware updates are correlated in time with the abnormal operating condition. For example, the one or more firmware updates may have been installed from an external node accessing equipment of the industrial operation 120.

In other examples, an abnormal data traffic condition includes recent changes to limits, to a control algorithm, system parameter changes, and the like. In other examples, an abnormal data traffic condition includes data sent to a display that doesn't match data from sensors 150. One of skill in the art will recognize other data traffic that may be interpreted as an abnormal data traffic condition.

The apparatus 200 includes a correlation module 212 configured to determine that the abnormal operating condition correlates to the abnormal data traffic condition. In some examples, the correlation module 212 determines that the abnormal operating condition correlates to the abnormal data traffic condition where the abnormal operating condition and the abnormal data traffic condition occur together and/or the abnormal data traffic condition occurs just prior to the abnormal operating condition or within a threshold amount of time before the abnormal operating condition. In some embodiments, the correlation module 212 works in conjunction with the abnormal data traffic module 210 where the abnormal data traffic module 210 identifies the abnormal data traffic condition based on both timing of an abnormal operating condition and other abnormal data traffic patterns, conditions, etc.

The apparatus 200 includes an alert module 214 configured to send a security alert in response to determining that the abnormal operating condition correlates to the abnormal data traffic condition. The security alert, in some embodiments, is sent to a system administrator, to an operator or other designated person or computing device. In other embodiments, the security alert triggers an action, such as shutting down certain equipment, cutting external communications, or other action designed to minimize damage, create a safe operating environment, to cut off external access from those trying to gain access or that have gained access and are attempting something that will cause harm, a safety condition, etc. In some embodiments, the security alert is sent by email, text message, or similar method. In other embodiments, the security alert is sent over ethernet. In other embodiments, the security alert is transmitted over the external condition monitoring system 160. One of skill in the art will recognize other options for sending a security alert, methods of transmitting the security alert, actions to take in response to the security alert, and the like.

Advantageously, the security apparatus 102 provides a mechanism to identify a security problem based on opportunistic sensing along with monitoring data traffic. The security apparatus 102 also advantageously provides a method of distinguishing a typical component failure from other intentional human caused system damage or takeover. In addition the security apparatus 102 may be used to identify problems with a legitimate or illegitimate firmware installation.

Figure 3:
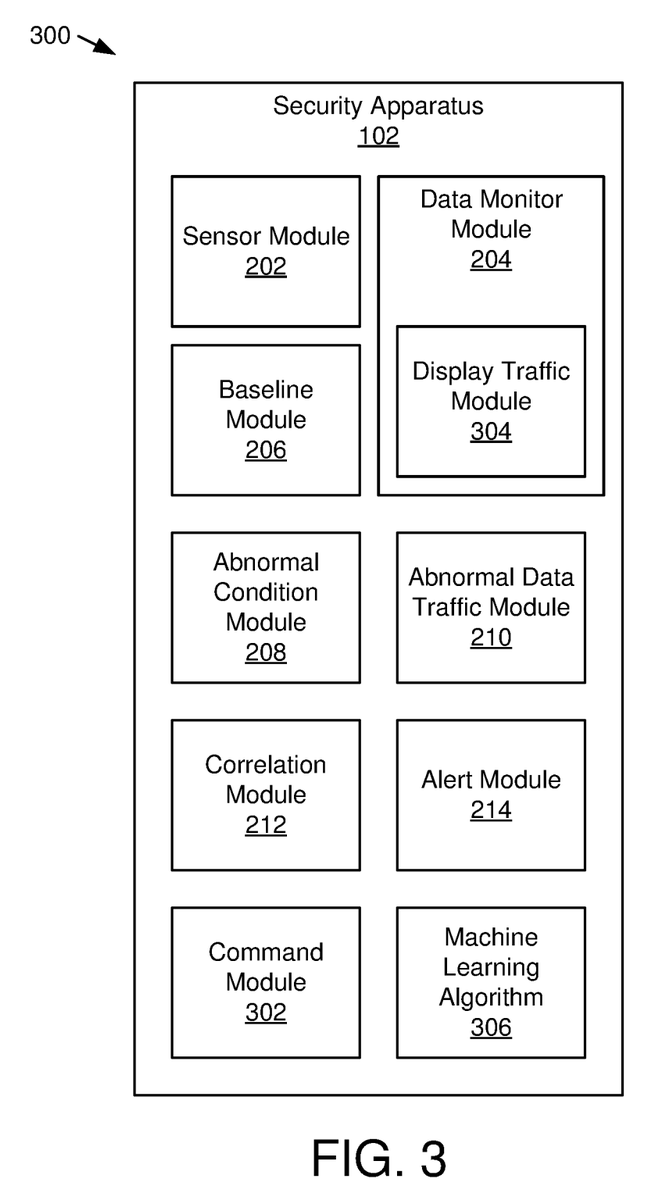
FIG. 3 is a schematic block diagram illustrating another embodiment of an apparatus for security and safety of an industrial operation.

FIG. 3 is a schematic block diagram illustrating another embodiment of an apparatus 300 for security and safety of an industrial operation 120. The apparatus 300 includes another embodiment of the security apparatus 102 that includes a sensor module 202, a data monitor module 204, a baseline module 206, an abnormal condition module 208, an abnormal data traffic module 210, a correlation module 212, and an alert module 214, which are substantially similar to those described above in relation to the apparatus 200 of FIG. 2. The apparatus 300 includes, in various embodiments, a command module 302, a display traffic module 304 in the data monitor module 204, and/or a machine learning algorithm, which are described below. The apparatus 300 may be implemented in similar ways as the apparatus 200 of FIG. 2.

In some embodiments, the apparatus 300 includes a command module 302 configured to receive commands used to control the industrial operation 120. Where the command module 302 is included, the baseline signature includes sensor information from the plurality of sensors for a normal operating condition correlated with commands related to the normal operating condition. For example, a current sensor 151 may include a certain current level in a drive 110, and a temperature sensor 153 in the drive 110 may include a certain temperature for a commanded speed of 50%, and the current and temperature may be increased for a commanded speed of 100%. The commanded speed may be correlated with the current from the current sensor 151 and temperature of the temperature sensor 153 in the baseline signature created by the baseline module 206.

In other embodiments, the apparatus 300 includes a display traffic module 304, which may be part of the data monitor module 204 in some embodiments. The display traffic module 304 is configured to monitor data sent to a display of operating parameters of the industrial operation 120. For example, the display of the operating conditions may be an electronic display of an operator and may display information such as speed of a rotating machine 122, a process temperature, a conveyor belt speed, whether equipment 124 is started or stopped, or any other information that may be useful to an operator of all or a portion of the industrial operation 120.

A problem that has occurred in the past is injection of a virus or malicious computer worm into a system where display signals were changed to display different information than actual conditions of equipment. One such situation occurred in a nuclear facility where speed of centrifuges were changed on electronic displays to be different than actual speeds of the centrifuges, which caused destruction of several very expensive centrifuges. Nefarious actors, in certain systems, can gain access to the system and falsify display data, which may result in damage to equipment and/or injury to personnel. The system may be damaged in a way as to cause long down times, which could be at least expensive or at worst could endanger people.

In the embodiments, the abnormal data traffic module 210 identifying the abnormal data traffic condition and the correlation module 212 determining that the abnormal operating condition correlates to the abnormal data traffic condition includes determining that the data sent to the display conflicts with sensor information of the identified abnormal operating condition. Thus, under such a condition the alert module 214 sends a security alert so that action may be taken to prevent or minimize damage to equipment, which may also prevent injury. In some embodiments, senor information from the plurality of sensors 150 may be routed differently from display signals to avoid falsifying of sensor information in addition to falsifying display information.

In some embodiments, the apparatus 200 includes a machine learning algorithm 306, which may be used by the baseline module 206 in deriving the baseline signature. For example, the machine learning algorithm 306 may receive sensor information from the sensors 150, 170, command information, etc. and may be used to create the baseline signature. In some embodiments, the machine learning algorithm 306 identifies patterns, trends, etc. during normal operation, which may be used to create the baseline signature. For example, the patterns, trends, etc. may be used in creating equations that describe the baseline signature. In other embodiments, the machine learning algorithm 306 may be used by the baseline module 206 to update the baseline signature during normal operation after a training period.

In other embodiments, the abnormal condition module 208 uses the machine learning algorithm 306 to identify an abnormal operating condition. For example, the abnormal condition module 208 may use the machine learning algorithm 306 to identify trends that depart from a baseline signature in an abnormal way to identify an abnormal operating condition. In other embodiments, the abnormal data traffic module 210 and/or the correlation module 212 use the machine learning algorithm 306 to identify and correlate and abnormal data traffic condition with an abnormal operating condition. The machine learning algorithm 306 may be used to identify timing correlations, trends, etc. to make the connection between the abnormal data traffic condition and the abnormal operating condition.

In some embodiments, the machine learning algorithm 306 uses a deep neural network. The deep neural network may include sensors 150, 170, command information, clock information, etc. as inputs and may output a baseline signature, an abnormal operating condition, an abnormal data traffic condition, a correlation between the abnormal data traffic condition and abnormal operating condition, etc. One of skill in the art will recognize other ways for the apparatus 300 to utilize the machine learning algorithm 306.

Figure 4:
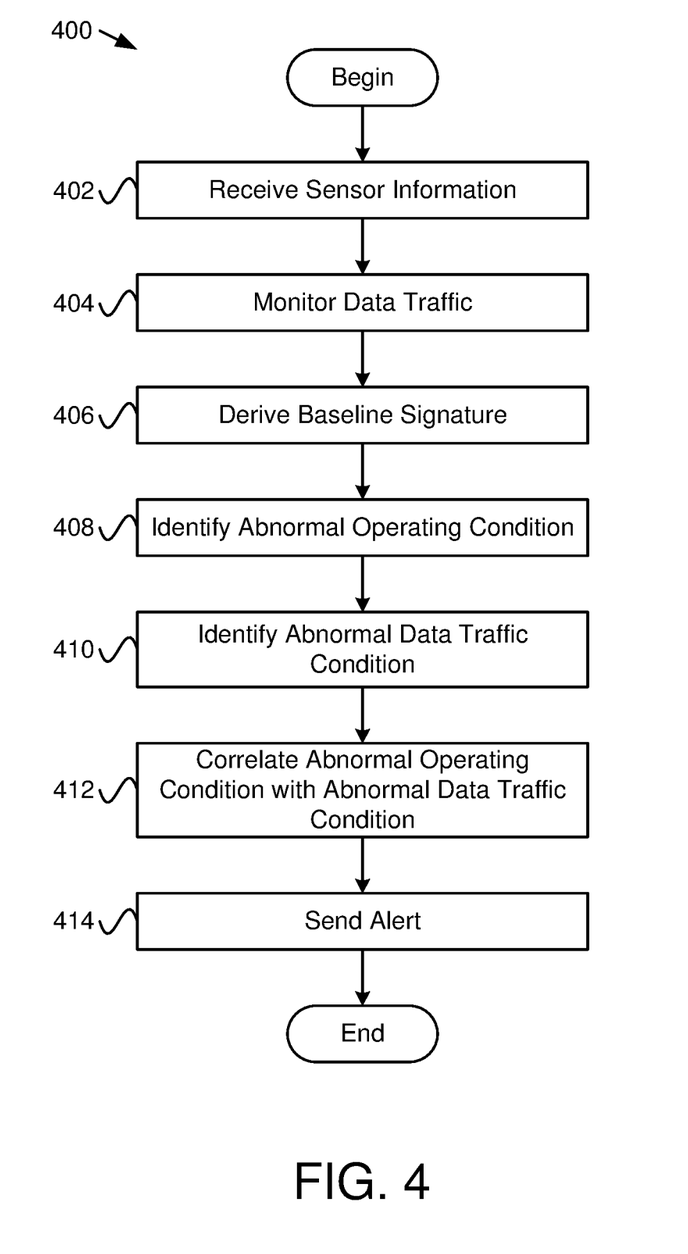
FIG. 4 is a flowchart diagram of one embodiment illustrating a method for security and safety of an industrial operation.

FIG. 4 is a flowchart diagram of one embodiment illustrating a method 400 for security and safety of an industrial operation 120. The method 400 begins and receives 402 sensor information from a plurality of sensors 150 of an industrial operation 120. The sensor information from at least a portion of the plurality sensors 150 is used for functionality of a plurality of components of the industrial operation 120. The method 400 monitors 404 data traffic of the industrial operation 120 and derives 406 a baseline signature from the sensor information. The baseline signature encompasses a range of normal operating conditions.

The method 400 identifies 408 an abnormal operating condition of the industrial operation 120 based on a comparison between additional sensor information from the plurality of sensors 150 and the baseline signature. The method 400 identifies 410 an abnormal data traffic condition and determines 412 that that the abnormal operating condition correlates to the abnormal data traffic condition and sends 414 a security alert in response to determining that the abnormal operating condition correlates to the abnormal data traffic condition, and the method 400 ends. In various embodiments, all or a portion of the method 400 is implemented using one or more of the sensor module 202, the data monitor module 204, the baseline module 206, the abnormal condition module 208, the abnormal data traffic module 210, the correlation module 212, the alert module 214, and the machine learning algorithm 306.

Figure 5:
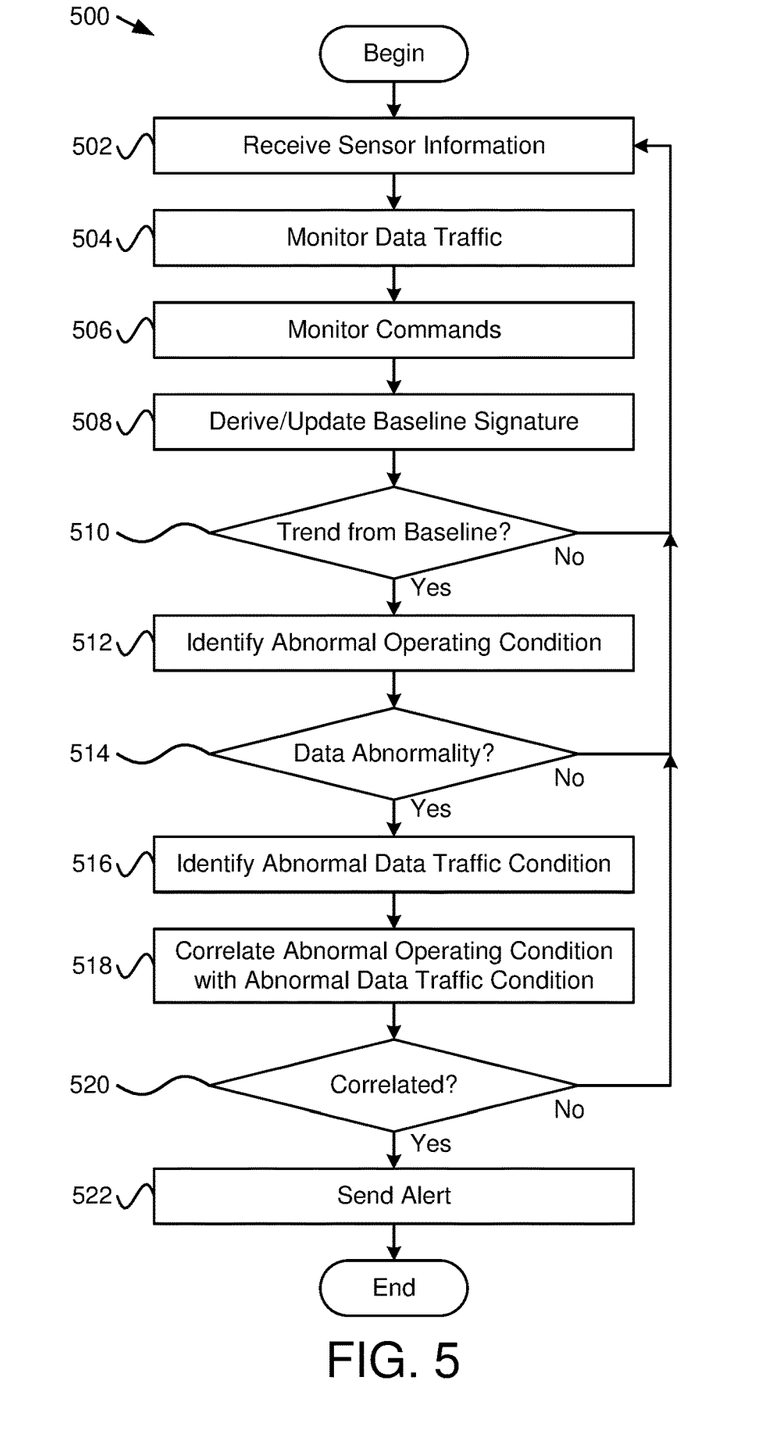
FIG. 5 is a flowchart diagram of another embodiment illustrating a method for security and safety of an industrial operation.

FIG. 5 is a flowchart diagram of another embodiment illustrating a method 500 for security and safety of an industrial operation 120. The method 500 begins and receives 502 sensor information from a plurality of sensors 150 of an industrial operation 120. The sensor information from at least a portion of the plurality sensors 150 is used for functionality of a plurality of components of the industrial operation 120. The method 500 monitors 504 data traffic and monitors 506 commands of the industrial operation 120 and derives 508 and/or updates 508 a baseline signature from the sensor information. The baseline signature encompasses a range of normal operating conditions.

The method 500 determines 510 if there is a trend from the baseline signature which is indicative of an abnormal operating condition. If the method 500 determines 510 that there is not a trend from the baseline signature indicative of an abnormal operating condition, the method 500 returns and receives 502 sensor information from the plurality of sensors 150. If the method 500 determines 510 that there is a trend from the baseline signature indicative of an abnormal operating condition, the method 500 identifies 512 the abnormal operating condition and determines 514 if there is an abnormal data traffic condition. If the method 500 determines 514 that there is not an abnormal data traffic condition, the method 500 returns and receives 502 sensor information from the plurality of sensors 150. Optionally, the method 500 sends an abnormal operating condition alert indicating the abnormal operating condition (not shown). Advantageously, the method 500 sending the abnormal operating condition alert indicates a component failure, a potential component failure, or the like without signaling a security issue.

If the method 500 determines 514 that there is an abnormal data traffic condition, the method 500 identifies 516 the abnormal data traffic condition and the method 500 attempts to correlate 518 the abnormal operating condition with the abnormal data traffic condition and determines 520 if the abnormal operating condition correlates to the abnormal data traffic condition. If the method 520 determines 520 that there is not a correlation between the abnormal operating condition and the abnormal data traffic condition, the method 500 returns and receives 502 sensor information from the plurality of sensors 150. If the method 500 determines 520 that there is a correlation between the abnormal operating condition and the abnormal data traffic condition, the method 500, the method 500 sends 522 a security alert in response to determining that the abnormal operating condition correlates to the abnormal data traffic condition, and the method 500 ends. In various embodiments, all or a portion of the method 500 is implemented using one or more of the sensor module 202, the data monitor module 204, the baseline module 206, the abnormal condition module 208, the abnormal data traffic module 210, the correlation module 212, the alert module 214, the command module 302, the display traffic module 304, and the machine learning algorithm 306.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving sensor information from a plurality of sensors of an industrial operation, sensor information from at least a portion of the plurality sensors is used for functionality of a plurality of equipment of the industrial operation;
   monitoring data traffic on a network communicably connecting the plurality of equipment of the industrial operation;
   deriving a baseline signature from the sensor information, the baseline signature encompassing a range of normal operating conditions;
   identifying an abnormal operating condition of the industrial operation based on a comparison between additional sensor information from the plurality of sensors and the baseline signature;
   identifying an abnormal data traffic condition based on the data traffic on the network;
   determining that a correlation exists between the abnormal operating condition and the abnormal data traffic condition, the correlation indicating that (i) the abnormal data traffic condition is a potential cause of the abnormal operating condition or (ii) the abnormal data traffic condition and the abnormal operating condition have a shared cause; and
   sending a security alert in response to determining that the correlation exists between the abnormal operating condition and the abnormal data traffic condition.

2. The method of claim 1, wherein the abnormal data traffic condition comprises a change in data traffic beyond a data traffic threshold and determining that the abnormal operating condition correlates to the abnormal data traffic condition comprises correlating timing of the abnormal data traffic condition with the abnormal operating condition.

3. The method of claim 2, wherein the change in data traffic is from a source external to the industrial operation.

4. The method of claim 2, wherein the change in data traffic is from a node added to the industrial operation for data access within a threshold amount of time prior to the abnormal operating condition.

5. The method of claim 1, wherein identifying the abnormal data traffic condition and determining that the correlation exists between the abnormal operating condition and the abnormal data traffic condition comprises determining that one or more firmware updates to one or more equipment of the industrial operation occurred prior to the abnormal operating condition and the one or more firmware updates are correlated in time with the abnormal operating condition.

6. The method of claim 5, wherein the one or more firmware updates were installed from an external node accessing equipment of the industrial operation.

7. The method of claim 1, further comprising receiving commands used to control the industrial operation, wherein the baseline signature comprises sensor information from the plurality of sensors for a normal operating condition correlated with commands related to the normal operating condition.

8. The method of claim 7, wherein monitoring the data traffic further comprises monitoring data sent to a display of operating parameters of the industrial operation and wherein identifying the abnormal data traffic condition and determining that the correlation exists between the abnormal operating condition and the abnormal data traffic condition comprise determining that the data sent to the display conflicts with sensor information of the identified abnormal operating condition.

9. The method of claim 1, wherein deriving the baseline signature comprises using a machine learning algorithm to derive the baseline signature.

10. The method of claim 1, wherein portions of the baseline signature are distributed among a plurality of devices in the industrial operation in a blockchain format and updates to the baseline signature are stored using a blockchain.

11. The method of claim 1, wherein the plurality of sensors are spread across a majority of the equipment of the industrial operation.

12. A component comprising:
   a sensor module configured to receive sensor information from a plurality of sensors of an industrial operation, sensor information from at least a portion of the plurality sensors is used for functionality of a plurality of components of the industrial operation;
   a data monitor module configured to monitor data traffic of the industrial operation;
   a baseline module configured to derive a baseline signature from the sensor information, the baseline signature encompassing a range of normal operating conditions;
   an abnormal operation module configured to identify an abnormal operating condition of the industrial operation based on a comparison between additional sensor information from the plurality of sensors and the baseline signature;
   an abnormal data module configured to identify an abnormal data traffic condition;
   a correlation module configured to determine that a correlation exists between the abnormal operating condition and the abnormal data traffic condition, the correlation indicating that (i) the abnormal data traffic condition is a potential cause of the abnormal operating condition or (ii) the abnormal data traffic condition and the abnormal operating condition have a shared cause; and an alert module sending an alert in response to determining that the correlation exists between the abnormal operating condition and the abnormal data traffic condition, wherein at least a portion of said modules comprise one or more of hardware circuits, a programmable hardware device and program code, the program code stored on one or more computer readable storage media.

13. The component of claim 12, wherein:
the abnormal data traffic condition comprises a change in data traffic beyond a data traffic threshold and determining that the correlation exists between the abnormal operating condition and the abnormal data traffic condition comprises correlating timing of the abnormal data traffic condition with the abnormal operating condition; and/or identifying the abnormal data traffic condition and determining that the correlation exists between the abnormal operating condition and the abnormal data traffic condition comprises determining that one or more firmware updates to one or more components of the industrial operation occurred prior to the abnormal operating condition and the one or more firmware updates are correlated in time with the abnormal operating condition.

14. The component of claim 13, wherein:
the change in data traffic is from a source external to the industrial operation; and/or
the change in data traffic is from a node added to the industrial operation for data access within a threshold amount of time prior to the abnormal operating condition.

15. The component of claim 13, wherein the one or more firmware updates were installed from an external node accessing equipment of the industrial operation.

16. The component of claim 12, further comprising a command module configured to receive commands used to control the industrial operation, wherein the baseline signature comprises sensor information from the plurality of sensors for a normal operating condition correlated with commands related to the normal operating condition.

17. The component of claim 16, wherein the data monitor module monitoring the data traffic further comprises a display traffic module configured to monitor data sent to a display of operating parameters of the industrial operation and wherein the abnormal data module identifying the abnormal data traffic condition and the correlation module determining that the correlation exists between the abnormal operating condition and the abnormal data traffic condition comprise determining that the data sent to the display conflicts with sensor information of the identified abnormal operating condition.

18. The component of claim 12, wherein portions of the baseline signature are distributed among a plurality of devices in the industrial operation in a blockchain format and updates to the baseline signature are stored using a blockchain.

19. A computer program product comprising a non-transitory computer readable storage medium having program code embodied therein, the program code executable by a processor to:
receive sensor information from a plurality of sensors of an industrial operation, sensor information from at least a portion of the plurality sensors is used for functionality of a plurality of equipment of the industrial operation;
monitor data traffic on a network communicably connecting the plurality of equipment of the industrial operation;
derive a baseline signature from the sensor information, the baseline signature encompassing a range of normal operating conditions;
identify an abnormal operating condition of the industrial operation based on a comparison between additional sensor information from the plurality of sensors and the baseline signature;
identify an abnormal data traffic condition based on the data traffic on the network;
determine that the abnormal operating condition correlates to the abnormal data traffic condition; and
send a security alert in response to determining that the abnormal operating condition correlates to the abnormal data traffic condition.

20. The computer program product of claim 19, wherein:
the abnormal data traffic condition comprises a change in data traffic beyond a data traffic threshold and determining that the abnormal operating condition correlates to the abnormal data traffic condition comprises correlating timing of the abnormal data traffic condition with the abnormal operating condition; and/or
identifying the abnormal data traffic condition and determining that the abnormal operating condition correlates to the abnormal data traffic condition comprises determining that one or more firmware updates to one or more equipment of the industrial operation occurred prior to the abnormal operating condition and the one or more firmware updates are correlated in time with the abnormal operating condition.

* * * * *